G. M. RAMSAY.
Steam Plow.

No. 16,807.

Patented Mar. 10, 1857.

UNITED STATES PATENT OFFICE.

GEORGE M. RAMSAY, OF NEW YORK, N. Y.

IMPROVEMENT IN STEAM-SPADES.

Specification forming part of Letters Patent No. 16,807, dated March 10, 1857.

*To all whom it may concern:*

Be it known that I, GEO. MORTON RAMSAY, of the city, county, and State of New York, have invented a new and Improved Spading-Machine; and I do hereby declare that the following is a full, clear, and exact description of the same; and it consists of a steam-power spading-machine constructed in such a manner that by the application of said power, two or more locomotive driving-wheels are made to travel upon the solid or unspaded earth, carrying with them the apparatus for generating and appropriating power necessary to the transportation, guidance, and operation, (by means of various gearing and shafting hereinafter described,) a series of perpendicular or parallel alternate revolving spades, in such a manner as to enter and leave the earth in that position, and that half of said spades are made to revolve in proportion to the distance traveled by either side, whereby the earth is spaded or sliced down and thrown back in a good condition for planting and cultivating, all of which is fully set forth in the following specification and accompanying drawings, including the letters, referring alike to each drawing and making part of this specification, wherein—

Figure 1:
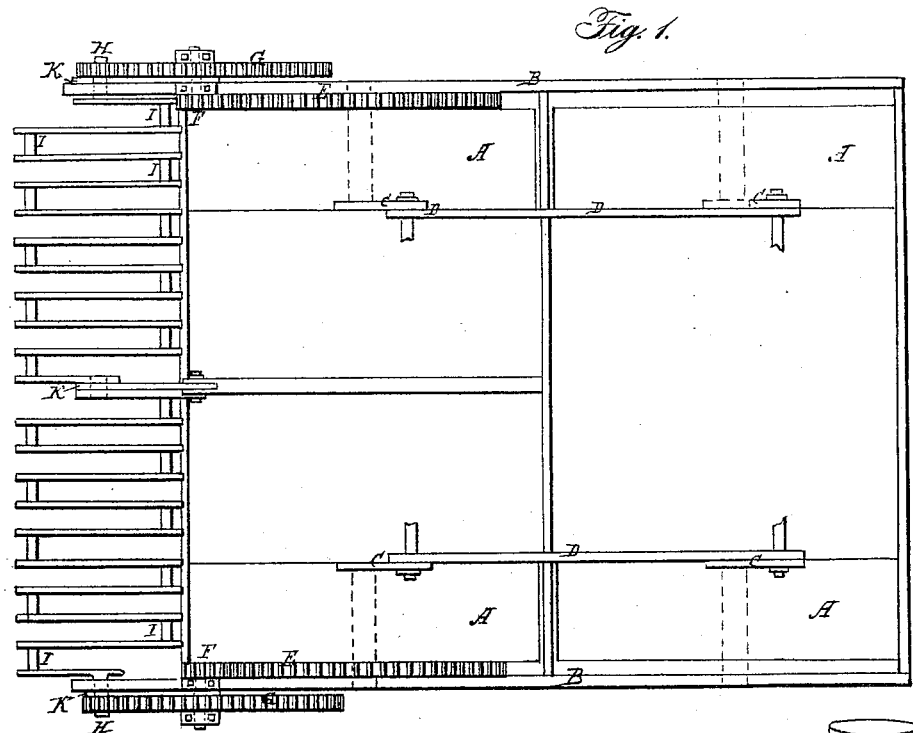
Figure 2:
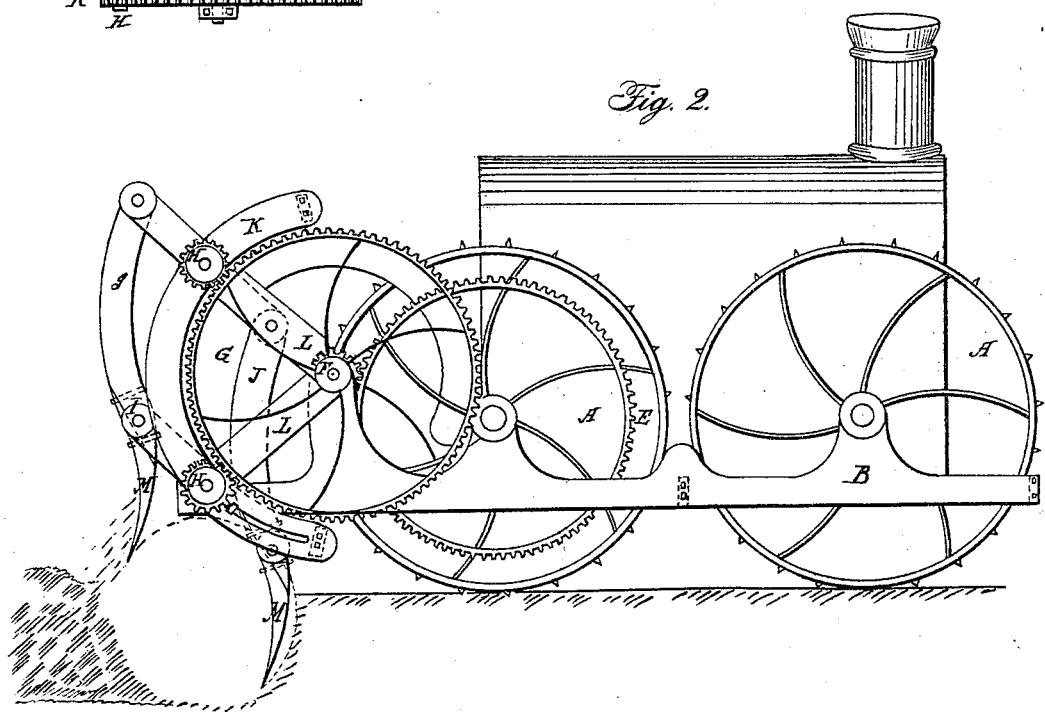

Figure 1 is a vertical longitudinal section, and Fig. 2 a top or plan view.

A is four locomotive and driving wheels, (about four feet diameter and thirteen inches in width,) with the usual ribs on their peripheries to prevent slipping.

B is a frame extending all around said wheels, having short axles or journals extending inward through the hubs A A, and upon which A revolves.

On the inner side of each wheel A, I affix a crank, C, by which the back and forward wheels, A, are connected by D.

E is a cog-wheel affixed to wheels A, Fig. 2, and revolving on the same journal, and connects with pinion-wheel F on the same shaft with G, which in its turn connects with pinion-wheel H on the end of double-crank shafts I and revolves with the same. I are connected or united by the perpendicular or parallel alternate revolving spades J, having movable points M. The double-crank shafts I are divided in the center at $k$, that each half may work independent of the other and in concert with the wheels of their respective sides or halves, whereby their revolutions are in number in proportion to the distance traveled by each side of the machine when turning curves. Spades J are made to spade the full width of the track made by wheels A, which prevents wheels A from traveling upon spaded earth. The frame K that supports the spades, crank-shafts, and wheels H, with the swing-arms L, are hung to or from the same journals of F and G in such a manner as to permit wheels H to roll up over and on wheels G, by which means the depth of spades J is controlled. The steam or other apparatus for generating and appropriating like power may occupy the center of the machine and be applied direct to G or A on each side of the machine by separate and independent apparatus, each propelling and operating its respective half, which better enables the conductor to control the course and action of the spades J. Hence in turning curves the spades of each side work uniformly in proportion to the distance traveled.

The operation consists of the revolutions of wheels A being communicated to and through the various gear-wheels and appurtenances described to the spades J, whereby they are made to revolve alternately in a perpendicular or parallel position, and are caused to enter and leave the earth in that position, and in passing through their crank-shafts (in their forward half-revolution) they are freed from dirt, and again enter the earth clean and sharp.

Having thus fully explained my invention, what I claim, and desire to secure by Letters Patent of the United States, is—

The alternate spades J, in combination with the double-crank shafts I, constructed, arranged, and operating substantially in the manner and for the purpose set forth.

GEO. MORTON RAMSAY.

Witnesses:
T. O. DAVIS,
B. HUNT.